United States Patent
El-Moussa et al.

(10) Patent No.: US 11,621,976 B2
(45) Date of Patent: Apr. 4, 2023

(54) MALICIOUS HOST DETECTION

(71) Applicant: British Telecommunications Public Limited Company, London (GB)

(72) Inventors: Fadi El-Moussa, London (GB); George Kallos, London (GB)

(73) Assignee: British Telecommunications Public Limited Company, London (GB)

( * ) Notice: Subject to any disclaimer, the term of this patent is extended or adjusted under 35 U.S.C. 154(b) by 461 days.

(21) Appl. No.: 16/636,278

(22) PCT Filed: Jul. 30, 2018

(86) PCT No.: PCT/EP2018/070630
§ 371 (c)(1),
(2) Date: Feb. 3, 2020

(87) PCT Pub. No.: WO2019/025384
PCT Pub. Date: Feb. 7, 2019

(65) Prior Publication Data
US 2020/0228544 A1    Jul. 16, 2020

(30) Foreign Application Priority Data
Aug. 2, 2017 (EP) .................................. 17184579

(51) Int. Cl.
*H04L 9/40* (2022.01)
*G06N 3/04* (2023.01)
*G06N 3/088* (2023.01)

(52) U.S. Cl.
CPC ......... *H04L 63/145* (2013.01); *G06N 3/0454* (2013.01); *G06N 3/088* (2013.01)

(58) Field of Classification Search
USPC .......... 726/2, 21, 23, 36; 713/150, 163, 181; 380/255, 264, 276
See application file for complete search history.

(56) References Cited

U.S. PATENT DOCUMENTS 7,219,239 B1 * 5/2007 Njemanze ........... H04L 63/0218
726/21
7,424,742 B1 * 9/2008 Dash ................... H04L 63/1425
726/22

(Continued)

OTHER PUBLICATIONS

Extended European Search Report for Application No. 17184579.5, dated Nov. 29, 2017, 9 pages.

(Continued)

*Primary Examiner* — Sharif E Ullah
(74) *Attorney, Agent, or Firm* — Patterson Thuente, P.A.

(57) ABSTRACT

A method for detecting malware software in a computer system includes accessing a plurality of hostnames for a malware server from a computer system infected with malware and attempting to communicate with the malware server, each hostname including a plurality of symbols in each of a plurality of symbol positions; training an autoencoder based on each of the plurality of hostnames, wherein the autoencoder includes: a set of input units for each possible symbol and symbol position in a hostname; output units each for storing an output of the autoencoder; and a set of hidden units smaller in number than the set of input units and each interconnecting all input and all output units with weighted interconnections, such that the autoencoder is trainable to provide an approximated reconstruction of values of the input units at the output units; selecting a set of one or more symbol and symbol position tuples based on weights of interconnections in the trained autoencoder; and identifying infected computer systems based on their attempted communication to hostnames having symbols in symbol positions consistent with the tuples in the set.

9 Claims, 3 Drawing Sheets

(56) References Cited

U.S. PATENT DOCUMENTS

| | | | | |
|---|---|---|---|---|
| 7,607,169 | B1* | 10/2009 | Njemanze | G06F 11/32 726/22 |
| 7,650,638 | B1* | 1/2010 | Njemanze | H04L 63/1408 713/170 |
| 7,788,722 | B1* | 8/2010 | Njemanze | H04L 63/1408 726/22 |
| 8,176,527 | B1* | 5/2012 | Njemanze | G06Q 10/06 709/224 |
| 8,402,543 | B1* | 3/2013 | Ranjan | H04L 63/1416 713/100 |
| 10,452,384 | B2* | 10/2019 | England | G06F 8/65 |
| 10,869,190 | B2* | 12/2020 | Mondello | G06Q 20/0855 |
| 11,088,821 | B2* | 8/2021 | Troia | H04W 4/44 |
| 11,101,984 | B2* | 8/2021 | Duval | H04L 9/3263 |
| 2012/0158626 | A1* | 6/2012 | Zhu | G06F 21/56 726/22 |
| 2017/0026390 | A1* | 1/2017 | Sofka | H04L 63/1416 |
| 2019/0042779 | A1* | 2/2019 | Agerstam | G06F 21/554 |
| 2019/0140919 | A1* | 5/2019 | Smith | H04L 9/50 |
| 2019/0207917 | A1* | 7/2019 | Tasher | G06F 12/1441 |
| 2019/0222609 | A1* | 7/2019 | Slipenchuk | G06F 16/24578 |
| 2019/0230002 | A1* | 7/2019 | Bernat | H04L 41/0893 |
| 2020/0050760 | A1* | 2/2020 | El-Moussa | G06F 21/567 |
| 2020/0053104 | A1* | 2/2020 | El-Moussa | G06N 3/04 |
| 2020/0082084 | A1* | 3/2020 | Kallos | G06F 21/561 |
| 2020/0082109 | A1* | 3/2020 | Kallos | G06F 21/564 |
| 2020/0084236 | A1* | 3/2020 | Kallos | G06N 3/088 |
| 2020/0119929 | A1* | 4/2020 | Edwards | H04L 9/3265 |
| 2020/0228569 | A1* | 7/2020 | El-Moussa | G06N 3/0454 |
| 2020/0374700 | A1* | 11/2020 | Smith | H04L 63/102 |
| 2021/0168164 | A1* | 6/2021 | El-Moussa | G06K 9/6262 |
| 2022/0141026 | A1* | 5/2022 | Smith | H04L 9/085 713/181 |
| 2022/0182410 | A1* | 6/2022 | Tupsamudre | H04L 63/1483 |

OTHER PUBLICATIONS

Hu Z., et al., "Identifying Malicious Web Domains Using Machine Learning Techniques with Online Credibility and Performance Data," IEEE Congress on Evolutionary Computation, 2016, 9 pages.

International Preliminary Report on Patentability for Application No. PCT/EP2018/070630, dated Feb. 13, 2020, 7 pages.

International Search Report and Written Opinion for Application No. PCT/EP2018/070630, dated Aug. 23, 2018, 10 pages.

Jian J., et al., "Botnet Domain Name Detection based on Machine Learning," ICWMMN2015 Proceedings, Downloaded on Feb. 20, 2021, 4 pages.

Office Action For GB Application No. 1712461.1, dated Jan. 16, 2018, 8 pages.

Shibahara T., et al., "Malicious URL Sequence Detection Using Event De-Noising Convolutional Neural Network," 2017 IEEE International Conference on Communications (ICC), May 21, 2017, pp. 1-7.

Yousefi-Azar M., et al., "Autoencoder-Based Feature Learning for Cyber Security Applications," 2017 International Joint Conference on Neural Networks (IJCNN), May 14, 2017, pp. 3854-3861.

* cited by examiner

MALICIOUS HOST DETECTION

PRIORITY CLAIM

The present application is a National Phase entry of PCT Application No. PCT/EP2018/070630, filed Jul. 30, 2018, which claims priority from EP Patent Application No. 17184579.5, filed Aug. 2, 2017, each of which is hereby fully incorporated herein by reference.

TECHNICAL FIELD

The present disclosure relates to the detection of malicious computing hosts. In particular, it relates to the detection of malicious hosts using a domain name server.

BACKGROUND

Computer systems infected by malicious software such as malware can communicate with other malicious machines such as malware servers. Such servers can coordinate, update, propagate and further infect machines in a network of infected machines. For an infected machine to communicate with a malware server it is necessary for the infected machine to address the malware server appropriately. Network intrusion detection systems (IDS) and malware detection systems are adept at identifying known malicious servers by network address such as IP address. Thus, any machine referring to, communicating with or even including any mention of a known malicious network address can be identified as an infected machine.

To overcome these challenges, malware developers can employ hostnames and uniform resource locators (URLs) resolved by domain name servers (DNS) to permit infected machines to communicate with malware servers without requiring that infected machines store a network address of the malware server. Furthermore, malware servers can adopt dynamically changing IP addresses and dynamic DNS to keep URLs relevant even where network a address changes while preventing detection of the malware server even when a URL is resolved to an IP address. However, even such hostnames and URLs are readily blacklisted when discovered by IDS or malware detectors.

Accordingly, malware developers adopt increasingly convoluted techniques to ensure infected machines can address malware servers without disclosing their infected status. One technique is to employ a malicious DNS controller, which may be an infected DNS server, to provide an infected machine with a URL for communicating with a malware server. The URL will change frequently and may be specific to each infected machine such that a number of infected machines each use different URLs that may all resolve to the same malware server (which itself may employ dynamic DNS to permit regular changes of its own IP address). The use of such techniques results in no common or consistent network address, no common or consistent URL/hostname, and therefore no common or consistent basis on which such information could be used by IDS or malware detection to identify malicious network references in computer systems.

SUMMARY

It would be advantageous to provide for an identification of network address information even in such circumstances.

The present disclosure accordingly provides, in a first aspect, a method for detecting malware software in a network connected computer system comprising: accessing a plurality of hostnames for a malware server from a training computer system infected with malware and attempting to communicate with the malware server, each hostname including a plurality of symbols in each of a plurality of symbol positions; training an autoencoder based on each of the plurality of hostnames, wherein the autoencoder includes: a set of input units for each possible symbol and symbol position in a hostname; output units each for storing an output of the autoencoder; and a set of hidden units smaller in number than the set of input units and each interconnecting all input and all output units with weighted interconnections, such that the autoencoder is trainable to provide an approximated reconstruction of values of the input units at the output units; selecting a set of one or more symbol and symbol position tuples based on weights of interconnections in the trained autoencoder; and identifying the infected computer system based on an attempted communication, by the computer system, to hostnames having symbols in symbol positions at least partially consistent with the tuples in the set. In some embodiments, responsive to the identifying, implementing a responsive measure to mitigate the effect or further spread of malware infecting identified infected computer systems.

In some embodiments, the responsive measure includes one or more of: preventing network communication by the identified infected computer system; instigating a malware and/or virus removal process for the identified infected computer system; flagging the identified infected computer system; and using the identified infected computer system to generate a second plurality of hostnames for further training the autoencoder.

In some embodiments, an attempted communication by a computer system includes storage of a hostname by a computer system for use in communicating with another computer system by way of the hostname.

In some embodiments, each input unit corresponds to a symbol and a symbol position in a hostname.

In some embodiments, the autoencoder is trainable using a backpropagation algorithm for adjusting weights of interconnections between the autoencoder units.

In some embodiments, training the autoencoder further includes using a gradient descent algorithm.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE FIGURES

Embodiments of the present disclosure will now be described, by way of example only, with reference to the accompanying drawings, in which.

DETAILED DESCRIPTION OF EMBODIMENTS

Figure 1:
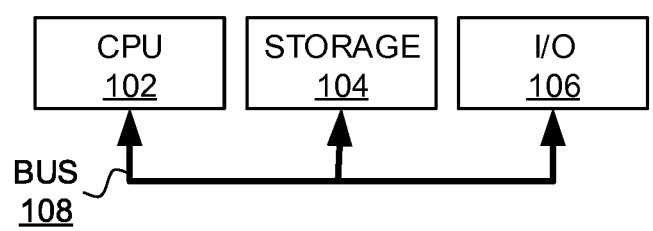
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection. While malicious DNS controllers can be arranged to provide different URLs for infected machines to communicate with a malware server, the very fact that the malicious DNS controller will generate such URLs routinely using a software algorithm results in all such URLs generated by a malicious DNS controller being fundamentally the product of some algorithmic process and, therefore, all URLs will inherently encode features of that algorithmic process. These features can present as characteristics of the generated URLs exhibiting potentially subtle commonality between the URLs. Such commonality may not even be readily discerned by a human operator, such as a pseudorandom formulation of URLs, though a trained machine learning process such as an autoencoder can be employed to reflect inherent features in a set of URLs arising from a DNS controller suitable for classifying URLs as malicious or otherwise. Embodiments of the present disclosure exploit these inherent features to detect malware software in network connected computer systems.

Figure 2:
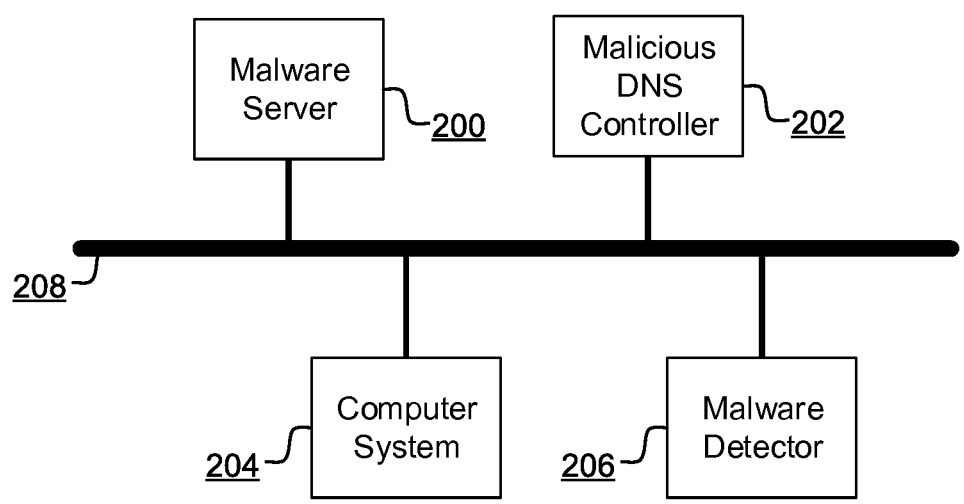
FIG. 2 illustrates an arrangement of a malware detector in accordance with embodiments of the present disclosure.

FIG. 2 illustrates an arrangement of a malware detector 206 in accordance with embodiments of the present disclosure. The malware detector 206 is a software, hardware, firmware or combination component connected to a network 208 such as a wired, wireless, local or wide area network. For example, the network 208 can be the internet. The malware detector 206 is arranged to detect malware infecting a computer system 204. Communication between the malware detector 206 and the computer system 204 may be provided via the network 208. Alternatively, the malware detector 206 may be directly connected to, interfaced with or associated with the computer system 204 for the purpose of malware detection. In one embodiment, each or either of the computer system 204 and the malware detector 206 can be partly or entirely virtualized machines. In one embodiment, the malware detector 206 executes as a software component installed on the computer system 204.

Where the computer system 204 is infected with a malware, the computer system 204 communicates with a malware server 200 as a hardware, software, firmware or combination component. The malware server 200 may be a coordinating server of potentially numerous infected computer systems to achieve a malicious intent. For example, the malware server 200 can seek to propagate, distribute and/or infect new machines with the malware. The malware server 200 may constitute part of a network of malware servers such as a botnet to which infected computer systems become a part and resources of infected computer systems are misappropriated and used for malicious purposes such as processor resource, storage resource, network resource and the like. Such malicious purposes can include the carrying out of malicious attacks on one or more other computer systems such as denial of service attacks, brute force attacks and the like.

To mitigate against detection, the malware server 200 can change its network address such as its internet protocol (IP) address regularly. Furthermore, to ensure a continued ability to communicate with the malware server 200, an infected computer system such as system 204 communicates with a malicious domain name service (DNS) controller 202. The malicious DNS controller 202 is not necessarily a DNS server as is well known in the art (although it may be an adapted form of such a server). The malicious DNS controller 202 is a malicious computer system for generating hostnames for infected computer systems to use to communicate with the malware server 200, each hostname resolving by DNS to a currently valid IP address of the malware server 200. The malicious DNS controller 202 can generate multiple different hostnames for accessing the malware server 200 such as a different hostname for each of one or more infected computer systems, and/or a different hostname for each of one or more periods of time. The malicious DNS controller 202 may also be operable to effect dynamic updates to DNS registrations for changing IP addresses of the malware server 200 such that infected computer systems can resolve, using DNS, hostnames provided by the malicious DNS controller 202 to a current valid IP address for the malware server 200.

Thus, in use, an infected computer system seeking to communicate with the malware server 200 first requests a hostname for the malware server 200 from the malicious DNS controller 202. The hostname resolves to an IP address for the malware server 200 and the infected computer system communicates with the malware server 200 using the hostname until the malware server changes address and/or the hostname is invalidated—which may occur routinely. The malware detector 206 is arranged to detect an infected computer system based on an attempted communication, by the computer system, to hostnames determined to be likely hostnames for the malware server 200. The malware detector 206 can, for example, monitor communication attempts by the computer system 204 to detect hostnames determined to be likely hostnames for the malware server 200. Additionally, or alternatively, the malware detector 206 can scan, parse, monitor or otherwise process one or more components and/or configurations of the computer system 204 to identify references stored therein to hostnames determined to be likely hostnames for the malware server 200.

Where the malware detector identifies the computer system 204 as infected with malware, one or more responsive measures can be implemented by the malware detector 206 or a cooperating component to mitigate any effects or further spread of malware infecting identified infected computer system 204. Such responsive measure can includes one or more of: preventing network communication by the identified infected computer system; instigating a malware and/or virus removal process for the identified infected computer system; flagging the identified infected computer system; and using the identified infected computer system to further improve the detection process.

Figure 3:
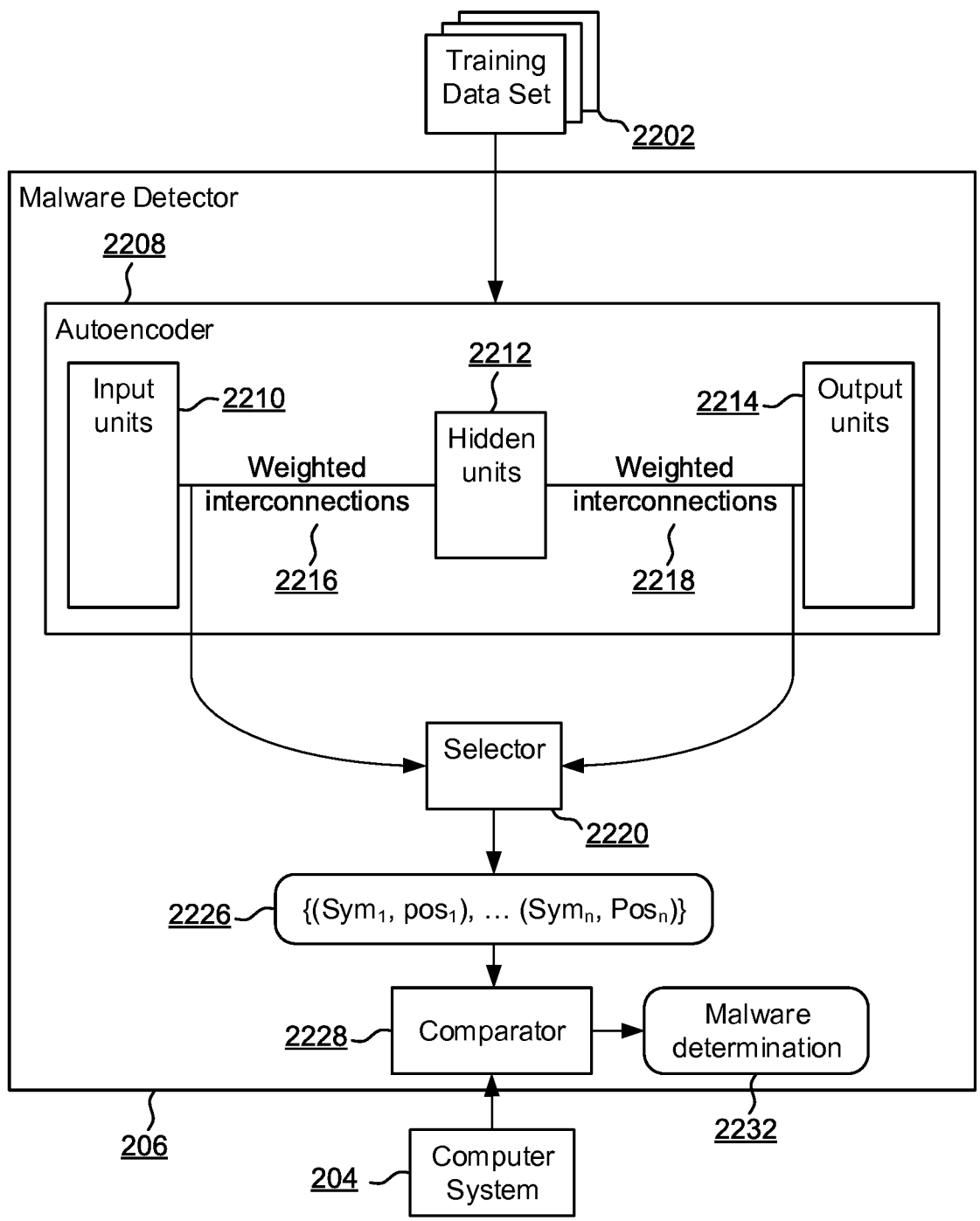
FIG. 3 illustrates an arrangement for detecting malware in accordance with embodiments of the present disclosure.

Mechanisms for detecting malware by the malware detector 206 according to embodiments of the present disclosure will now be described. FIG. 3 illustrates an arrangement for detecting malware in accordance with embodiments of the present disclosure. The malware detector 206 includes an autoencoder 2208 as a machine learning component for learning features of known malicious server hostnames. The autoencoder 2208 is initially trained using a training data set 2202 of known hostnames for the malware server 200, such training data set 2202 being accessed by the malware detector 206 from, for example, a training computer system known to be infected with malware and known to be attempting to communicate with the malware server 200. Alternatively, the training data set 2202 can be obtained by direct communication with the malicious DNS controller 202, such as by mimicking the operation of an infected computer system. Subsequently, the trained autoencoder 2208 is used by a selector component 2220 to select a set of one or more symbol and symbol position tuples (i.e. each tuple including a symbol identifier and a symbol position identification) characterizing features of known malware hostnames in the training data set.

Taking hostnames for IP addresses as an example, a hostname is comprised of potentially multiple labels separated by a period symbol ".". For example, "www.example.com" has three labels "www", "example" and "com". Each label can be formed of a maximum of 63 symbols typically corresponding to ASCII symbols such as letters, numbers and a hyphen (many other ASCII symbols being excluded for having a special meaning in hostnames and/or URLs, such as the period itself ".", the addition symbol "+", the forward slash symbol "/" and others). Aggregating all labels and intervening period symbols, a hostname has a maximum of 253 symbols which are typically encoded in 255 octets including 2 octets for encoding a length of the hostname. Thus, embodiments of the disclosure seek to identify a set of tuples of symbols and symbol positions suitable for identifying a hostname as likely corresponding to a hostname for the malware server 200.

In accordance with embodiments of the present disclosure, an autoencoder includes: a set of input units each for representing a possible hostname symbol and a location of the symbol in a hostname; output units each for storing an output of the autoencoder; and a set of hidden units smaller in number than the set of input units and each interconnecting all input and all output units with weighted interconnections. Accordingly, the autoencoder is trainable to provide an approximated reconstruction of values of the input units at the output units. Such training can occur using back propagation as is well known to those skilled in the art. Additionally and optionally, a gradient descent algorithm can be employed during training to improve the training process.

According to embodiments of the present disclosure, the autoencoder is trained based on multiple hostnames to determine weights of interconnections with hidden units in the autoencoder. For example. A hostname label having up to 63 symbols taken from an alphabet including the non-case-sensitive characters "a" to "z", "0" to "9" and the hyphen symbol (i.e. 37 possible symbols in all) will require 37 input units for each of 63 possible symbols in the hostname label. Thus, 2331 inputs to the autoencoder are required for such a hostname label. Similar arrangements can be made for each label such that an autoencoder can be provided for potentially multiple labels or, alternatively, a single autoencoder can be provided for all labels. Hereinafter a single 63 symbol label will be considered and will be referred to as the hostname though it will be apparent to those skilled in the art that multiple such labels constituting an entire hostname may be employed. Thus, taking 2331 input (and, therefore, output) units, a smaller number of hidden units is provided such as a proportion of a number of input units e.g.

75% of the number of input units.

FIG. 3 illustrates an arrangement for identifying a set 2226 of symbol/position tuples characterizing malware server hostnames. An autoencoder 2208 is provided including a plurality of input units 2210, output units 2214 and hidden units 2212. A number of hidden units 2212 is lower than a number of input units 2210 such that the autoencoder essentially encodes input received via the input units 2210. Each hidden unit is interconnected with each and every input unit and with each and every output unit. Bias units may additionally be provided as will be apparent to those skilled in the art.

The interconnections between input, hidden and output units are variably weighted so as to provide a learning function for the autoencoder 2208. The weights associated with each interconnection is initially initialized to some default value or, in some embodiments, random values, in readiness for adjustment as part of a learning process. Each unit in at least the set of hidden units 2212 propagates a signal (typically a numeric value, such as a normalized value in a range 0 to 1) along interconnections to output units 2214 according to: some combination of signals received along incoming connections to the unit from input units affected by a function of the weighting of each incoming interconnection; and a trigger function of the unit defining when the unit will generate an output signal across outgoing interconnections to output units 2214. Such trigger function can be, for example, a sigmoid function, mathematical tan function or other suitable trigger functions as will be apparent to those skilled in the art. The combination of signals received along incoming connections can be an aggregate of signal values, each the product of the signal value and a weight of a corresponding interconnection.

The autoencoder 2208 is configured to generate, at output units 2214, an approximation of a signal received at input units 2210 by a learning process involving adjustments to weightings of interconnections 2216 and 2218. Thus, multiple training examples 2202 are provided to the autoencoder 2208 to effect the training process. Each training example includes a hostname of known malware server 200.

The autoencoder 2208 processes each training example to adjust the weights of interconnections to configure the autoencoder 2208 to generate, at output units 2214, an approximation of a signal received at input units 2210. The adjustments can be made using, for example, a back propagation process as is known in the field of autoencoders. Additionally and optionally, the learning process can employ a gradient descent algorithm such as is described at ufldl.stanford.edu/wiki/index.php/Exercise:Sparse_Autoencoder, at nlp.stanford.edu/~socherr/ sparseAutoencoder_2011new.pdf, and at web.stanford.edu/ class/cs294a/cs294a_2011-assignment.pdf. A number of training examples selected for effective autoencoder training must be sufficient and in some embodiments can be at least twenty examples, for example over 100 examples.

Once all training examples are processed by the autoencoder 2209, a selector 2220 component is operable to select one or more symbols and associated symbol positions as symbol/position tuples 2226. The selector 2220 is a hardware, software, firmware or combination component adapted to perform such selection based on the weights of the interconnections in the autoencoder 2208. The weight of an interconnection is defined by the adjustments made during the learning process as described above. Accordingly, a weight of an interconnection indicates a relative degree of significance of a symbol/position to the output of the autoencoder 2208. Thus, an identification of interconnections having higher weights in the autoencoder 2208 can be used to infer a symbol/position tuple most likely to be associated with a malicious hostname. In one embodiment, the weight of interconnections 2216 between only the input units 2210 and the hidden units 2212 are used to select candidate tuples

2226 such that interconnections from input units having most significant weights (e.g. greatest weights) identify associated input units and corresponding tuples as candidate tuples. In an alternative embodiment, the weight of either or both of: interconnections 2216 between the input units 2210 and the hidden units 2212; and/or interconnections 2218 between the hidden 2212 units and the output units 2214 are used to identify candidate tuples.

Subsequently, the symbol/position tuples 2226 are used by a comparator component 2228 to identify hostnames used by a computer system 204 to detect attempted or prospective communication with a hostname likely to relate to the malware server 200. For example, the comparator 2228 can compare the tuple set 2226 with: hostnames used by the computer system 204 for communication: hostnames stored in the computer system 204, such as by scanning, parsing or otherwise monitoring the computer system 204 or software installed thereon; hostnames provided to the computer system 204 by a malicious DNS controller 202; hostnames passed by the computer system 204 for resolution by a DNS server; hostnames indicated or implicated in responses from DNS server(s) to the computer system 204; and other mechanisms as will be apparent to those skilled in the art.

Where the comparator 2228 detects hostnames used by the computer system 204 for attempted communication that match the symbol/position tuple set then a positive identification of malware infection of the computer system 204 is determined. Thus, the symbol/position tuple set 2226 can be considered to constitute a set of rules such that hostnames having a particular symbol at particular position indicated in a tuples in the set 2226 are determined to satisfy a rule defined by the tuple. Satisfaction of rules can be determined in its entirety (i.e. all rules must be satisfied) or at least partially to a predetermined extent. For example, a proportion of rules must be satisfied, such as 70% of the rules defined by the tuple set 2226. In an alternative embodiment, tuples in the tuple set can be weighted according to the strength of their occurrence when derived from the autoencoder 2208 such that higher weighted rules are more important indicators of malware hostnames.

Figure 4:
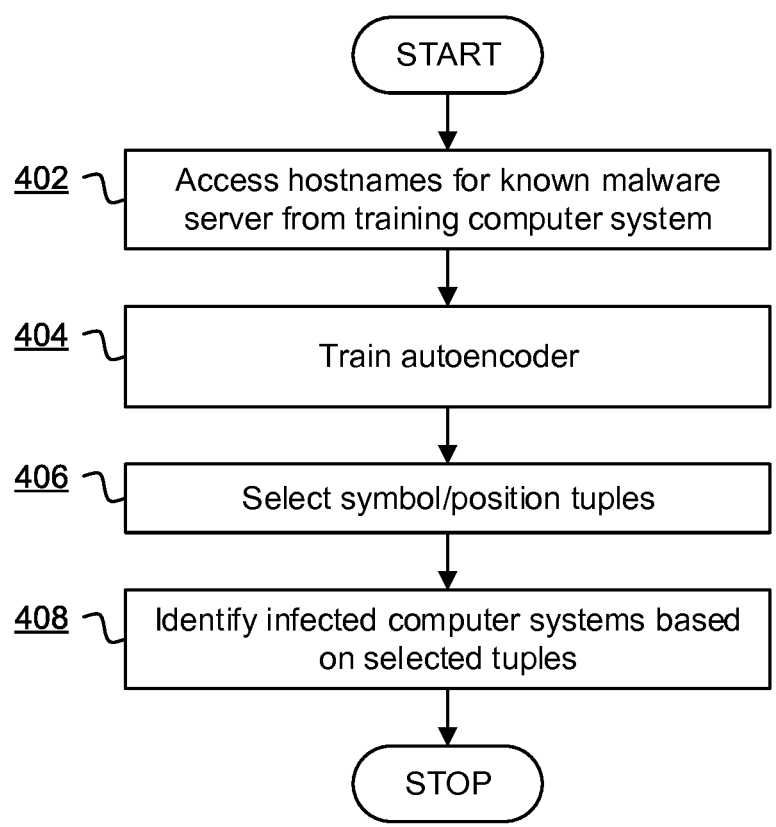
FIG. 4 is a flowchart of a method for detecting malware software in a network connected computer system in accordance with embodiments of the present disclosure.

FIG. 4 is a flowchart of a method for detecting malware software in a network connected computer system in accordance with embodiments of the present disclosure. Initially, at 402, known hostnames for a malware server 200 are accessed, each hostname including a plurality of symbols in each of a plurality of symbol positions. At 404 the autoencoder 2208 is trained based on each of the accessed hostnames. The autoencoder includes: a set of input units for each possible symbol and symbol position in a hostname; output units each for storing an output of the autoencoder; and a set of hidden units smaller in number than the set of input units and each interconnecting all input and all output units with weighted interconnections, such that the autoencoder is trainable to provide an approximated reconstruction of values of the input units at the output units. At 406, the selector 2220 selects a set of one or more symbol and symbol position tuples based on the weights of interconnections in the trained autoencoder 2208. At step an infected computer system 204 is identified based on an attempted communication, by the computer system, to hostnames having symbols in symbol positions at least partially consistent with the tuples in the set.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for detecting malware software in a network connected computer system comprising:
accessing a plurality of hostnames for a malware server from a training computer system infected with malware and attempting to communicate with the malware server, each of the plurality of hostnames including a plurality of symbols in each of a plurality of symbol positions;
training an autoencoder based on each of the plurality of hostnames, wherein the autoencoder includes:
a set of input units for each possible symbol and symbol position in a hostname, output units each for storing an output of the autoencoder, and
a set of hidden units smaller in number than the set of input units and each interconnecting all input units and all output units with weighted interconnections, such that the autoencoder is trainable to provide an approximated reconstruction of values of the input units at the output units;
selecting a set of one or more symbol and symbol position tuples based on weights of interconnections in the trained autoencoder; and
identifying an infected computer system based on an attempted communication, by the infected computer system, to hostnames having symbols in symbol positions at least partially consistent with the tuples in the set of one or more symbol and symbol position.

2. The method of claim 1, wherein, responsive to the identifying, the method further comprises implementing a responsive measure to mitigate an effect or further spread of malware infecting the identified infected computer system.

3. The method of claim 2, wherein the responsive measure includes one or more of:
preventing network communication by the identified infected computer system;
instigating at least one of a malware removal process or a virus removal process for the identified infected computer system;
flagging the identified infected computer system; or
using the identified infected computer system to generate a second plurality of hostnames for further training the autoencoder.

4. The method of claim 1, wherein the attempted communication by the infected computer system includes storage of a hostname by the computer system for use in communicating with another computer system by way of the hostname.

5. The method of claim 1, wherein each input unit corresponds to a symbol and a symbol position in a hostname.

6. The method of claim 1, wherein the autoencoder is trainable using a backpropagation algorithm for adjusting weights of interconnections between the input units, the output units, and the hidden units of the autoencoder.

7. The method of claim 1, wherein training the autoencoder further includes using a gradient descent algorithm.

8. A computer system comprising:
a processor and memory storing computer program code for detecting malware software in a network connected computer system by:
accessing a plurality of hostnames for a malware server from a training computer system infected with malware and attempting to communicate with the malware server, each of the plurality of hostnames including a plurality of symbols in each of a plurality of symbol positions;
training an autoencoder based on each of the plurality of hostnames, wherein the autoencoder includes:
a set of input units for each possible symbol and symbol position in a hostname,
output units each for storing an output of the autoencoder, and
a set of hidden units smaller in number than the set of input units and each interconnecting all input units and all output units with weighted interconnections, such that the autoencoder is trainable to provide an approximated reconstruction of values of the input units at the output units;
selecting a set of one or more symbol and symbol position tuples based on weights of interconnections in the trained autoencoder; and
identifying an infected computer system based on an attempted communication, by the infected computer system, to hostnames having symbols in symbol positions at least partially consistent with the tuples in the set of one or more symbol and symbol position.

9. A non-transitory computer-readable storage element comprising computer program code to, when loaded into a computer system and executed thereon, cause the computer system to perform the method as claimed in claim 1.

* * * * *